US012430051B2

(12) United States Patent
Chen et al.

(10) Patent No.: US 12,430,051 B2
(45) Date of Patent: Sep. 30, 2025

(54) METHOD, ELECTRONIC DEVICE, AND COMPUTER PROGRAM PRODUCT FOR EXPANDING STORAGE DEVICE CLUSTER

(71) Applicant: Dell Products L.P., Round Rock, TX (US)

(72) Inventors: Xing Chen, Shanghai (CN); Dazhi Dong, Shanghai (CN); Lei Lei, Shanghai (CN); Guoqiang Ma, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 63 days.

(21) Appl. No.: 18/498,256

(22) Filed: Oct. 31, 2023

(65) Prior Publication Data

US 2024/0361930 A1  Oct. 31, 2024

(30) Foreign Application Priority Data

Apr. 28, 2023 (CN) .......................... 202310487810.3

(51) Int. Cl.
*G06F 3/06* (2006.01)

(52) U.S. Cl.
CPC ............ *G06F 3/0634* (2013.01); *G06F 3/067* (2013.01); *G06F 3/0604* (2013.01)

(58) Field of Classification Search
CPC ....... G06F 3/0634; G06F 3/067; G06F 3/0604
See application file for complete search history.

(56) References Cited

U.S. PATENT DOCUMENTS

| | | |
|---|---|---|
| 8,484,356 B1 | 7/2013 | Douglis et al. |
| 8,554,918 B1 | 10/2013 | Douglis |
| 11,445,036 B1* | 9/2022 | Wu ..................... H04L 41/0893 |
| 2008/0184070 A1* | 7/2008 | Chen .................. G06F 11/1441 714/E11.113 |
| 2012/0084626 A1* | 4/2012 | Pandey ................ G06F 3/0605 714/E11.03 |
| 2016/0050146 A1 | 2/2016 | Henderson |
| 2016/0285707 A1 | 9/2016 | Pawlowski et al. |
| 2017/0279674 A1* | 9/2017 | Zhu ..................... H04L 41/5012 |
| 2018/0275902 A1 | 9/2018 | Monday et al. |
| 2020/0136909 A1* | 4/2020 | Eaton .................. H04L 41/0873 |
| 2021/0028987 A1 | 1/2021 | Krivenok |
| 2021/0034268 A1* | 2/2021 | Hara ..................... G06F 3/0604 |
| 2021/0136146 A1* | 5/2021 | Welsch .................. H04L 69/40 |
| 2022/0006654 A1* | 1/2022 | Sharma ................ H04L 9/3236 |

* cited by examiner

Primary Examiner — Ryan Bertram
(74) Attorney, Agent, or Firm — BainwoodHuang

(57) ABSTRACT

Techniques for expanding a storage device cluster involve acquiring identity information of a first storage device to be added to the storage device cluster and expansion configuration information. Such techniques further involve acquiring corresponding identity information of a plurality of storage devices in a network in which the storage device cluster is located. Such techniques further involve adding, in response to one piece of identity information in the corresponding identity information being the same as the identity information of the first storage device, the first storage device to the storage device cluster based on the expansion configuration information to form an expanded storage device cluster.

20 Claims, 4 Drawing Sheets

METHOD, ELECTRONIC DEVICE, AND COMPUTER PROGRAM PRODUCT FOR EXPANDING STORAGE DEVICE CLUSTER

CROSS-REFERENCE TO RELATED APPLICATION

This application claims priority to Chinese Patent Application No. CN202310487810.3, on file at the China National Intellectual Property Administration (CNIPA), having a filing date of Apr. 28, 2023, and having "METHOD, ELECTRONIC DEVICE AND COMPUTER PROGRAM PRODUCT FOR EXTENDING STORAGE DEVICE CLUSTER" as a title, the contents and teachings of which are herein incorporated by reference in their entirety.

TECHNICAL FIELD

Embodiments of the present disclosure relate to the field of computer storage and, more specifically, to a method, an electronic device, and a computer program product for expanding a storage device cluster.

BACKGROUND

With the increase of the business scale of users, it becomes an option to add more storage devices to existing storage device clusters to increase the storage capacity. The expansion of a storage device cluster is typically a process in which the staff connects new storage devices to a known storage device cluster and manages the new storage devices under the existing storage device management interface. If a user's need to expand a storage device cluster is large or frequent, the above manual expansion process, especially the manual management process of new storage devices, will be complex and cumbersome. An improved storage device cluster expansion solution is needed to simplify the above operations.

SUMMARY OF THE INVENTION

Embodiments of the present disclosure provide a solution for expanding a storage device cluster.

In a first aspect of the present disclosure, a method for expanding a storage device cluster is provided. The method may include: acquiring identity information of a first storage device to be added to the storage device cluster and expansion configuration information. The method may further include: acquiring corresponding identity information of a plurality of storage devices in a network in which the storage device cluster is located. In addition, the method may include: adding, in response to one piece of identity information in the corresponding identity information being the same as the identity information of the first storage device, the first storage device to the storage device cluster based on the expansion configuration information to form an expanded storage device cluster.

In a second aspect of the present disclosure, an electronic device is provided, which includes a processor; and a memory coupled to the processor, the memory having instructions stored therein, wherein the instructions, when executed by the processor, cause the electronic device to perform actions including: acquiring identity information of a first storage device to be added to a storage device cluster and expansion configuration information; acquiring corresponding identity information of a plurality of storage devices in a network in which the storage device cluster is located; and adding, in response to one piece of identity information in the corresponding identity information being the same as the identity information of the first storage device, the first storage device to the storage device cluster based on the expansion configuration information to form an expanded storage device cluster.

In a third aspect of the present disclosure, a computer program product is provided that is tangibly stored on a computer-readable medium and includes machine-executable instructions, wherein the machine-executable instructions, when executed, cause a machine to perform any steps of the method according to the first aspect.

The Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

Example embodiments of the present disclosure are described in more detail with reference to the accompanying drawings, the above and other objectives, features, and advantages of the present disclosure will become more apparent, and identical or similar reference numbers generally represent identical or similar components in the example embodiments of the present disclosure. In the accompanying drawings.

DETAILED DESCRIPTION

Figure 1:
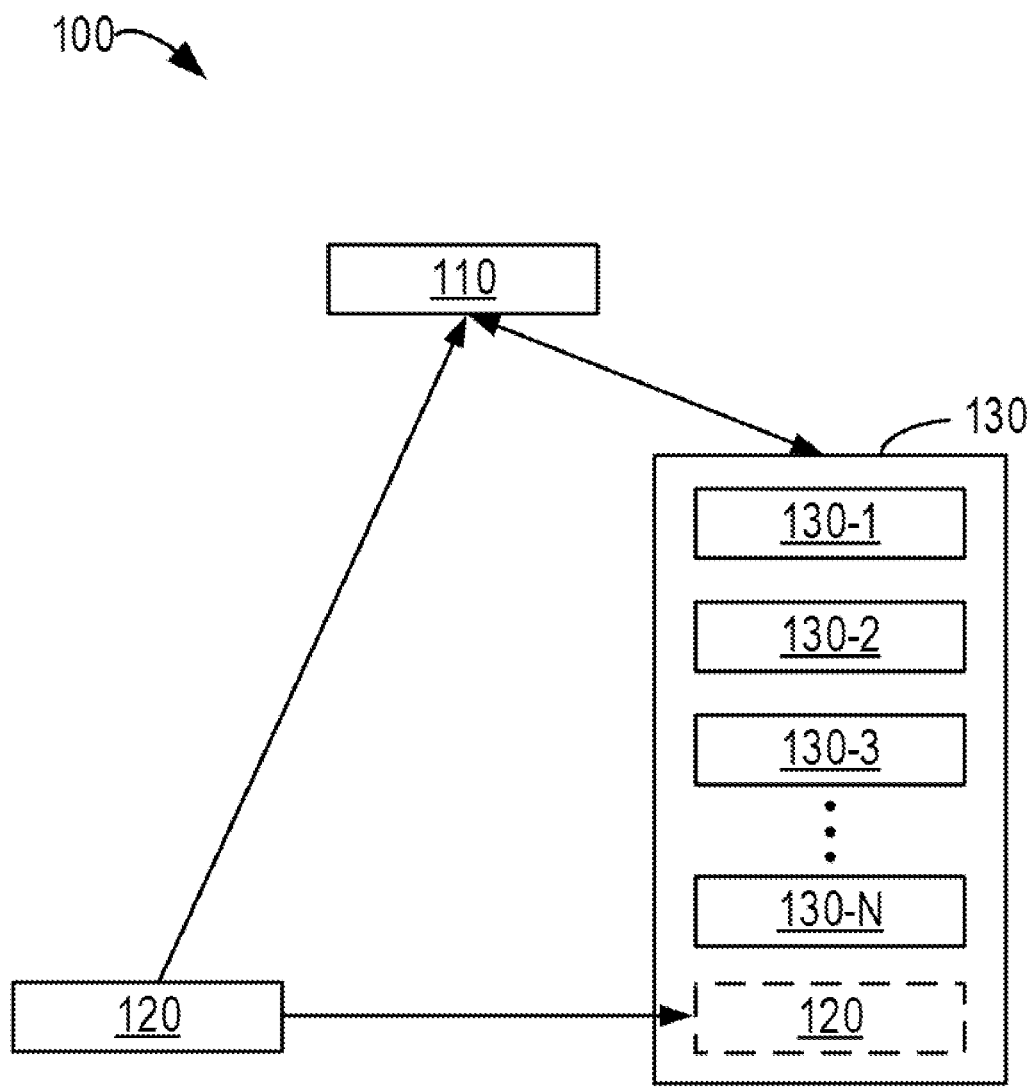
FIG. 1 illustrates a schematic diagram of an example environment according to embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, various embodiments will be described in detail with reference to the accompanying drawings. The embodiments described below are provided as examples only and should not be construed as limiting. For example, while a particular arrangement or component is provided in an embodiment, other configurations may be used in other embodiments.

The principles of the present disclosure will be described below with reference to several example embodiments illustrated in the accompanying drawings.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "a group of example embodiments." The term "another embodiment" indicates "a group of other embodiments." The terms "first," "second," and the like may refer to different or identical objects. Other explicit and implicit definitions may also be included below.

As discussed above, after installing new storage devices in a data center configured with one or more storage device clusters, the staff needs to use the user interface or application programming interface (API) provided by the storage device clusters to discover storage devices that are not configured in software. Since the configurations applied to the newly connected storage devices contain various configurations, the process of expanding a storage device cluster includes a series of time-consuming manual management operations. For the multi-tenant data center scenario, there may be multiple storage device clusters operating independently. When the number of storage device clusters that need to be expanded is large, the complexity of connection and management operations of new storage devices by the staff will be significantly increased, which requires repeated debugging by professional workers, thus affecting the user experience.

To at least partially address the above disadvantages, embodiments of the present disclosure provide a novel storage device cluster expansion solution. The present disclosure is intended to provide a new solution for storage device cluster expansion based on identity information of a new storage device and expansion configuration information that are pre-inputted. As an example, the identity information of the new storage device and the expansion configuration information are pre-inputted to a computing device by the staff. Afterwards, the computing device can periodically check whether the identity information of the storage devices in its management network is the same as this pre-inputted identity information. If they are the same, it indicates that the new storage device is already physically connected to this management network. As a result, the computing device can automatically add the new storage device to the storage device cluster based on the expansion configuration information. This design changes the conventional storage device cluster expansion process, and it can implement automated management of newly connected storage devices after manual input of relevant information, so that the software debugging work for a large number of new storage devices can be avoided, thus improving user experience.

FIG. 1 illustrates a schematic diagram of an example environment 100 according to embodiments of the present disclosure. In the example environment 100, a device and/or process according to the embodiments of the present disclosure can be implemented. As shown in FIG. 1, the example environment 100 may include a computing device 110, a first storage device 120 (which may be referred to herein as a "storage device to be connected"), and a storage device cluster 130 to be expanded that are located in a management network. It should be noted that the storage device cluster 130 may contain a plurality of storage devices, for example, storage devices 130-1, 130-2, 130-3, . . . , and 130-N. N may be any natural number here.

It should be understood that the computing device 110 is configured to add the first storage device 120 to the storage device cluster 130. Specifically, the staff or user may input the identity information of the first storage device 120 and the expansion configuration information for subsequent storage device cluster expansion operations to the computing device 110 in advance. At this point, the first storage device 120 is not physically connected to the storage device cluster 130. After that, the computing device 110 performs periodic information interaction with the storage device cluster 130 to acquire the identity information of all storage devices of the storage device cluster 130. After the staff physically connects the first storage device 120 to the storage device cluster 130, the computing device 110 may determine from the interacted information with the storage device cluster 130 that the first storage device 120 has been physically connected to the storage device cluster 130, whereby the computing device 110 can automatically implement software management of the first storage device 120 based on the expansion configuration information pre-inputted by the staff. It should be understood that the computing device 110 described herein is not limited to being set independently from the storage device cluster 130, but may also be set inside the storage device cluster 130 to operate as a controller. In addition, the user may input the identity information of the first storage device 120 and the expansion configuration information to the computing device 110 via an interface associated with the computing device 110.

In some embodiments, the computing device 110 may be any device with computing power. As a non-limiting example, the computing device may be any type of stationary computing device, mobile computing device, or portable computing device, including but not limited to a desktop computer, a laptop computer, a notebook computer, a netbook computer, a tablet computer, and the like. All or a portion of components of the computing device may be distributed in a cloud. The computing device and the nodes connected thereto may also adopt a cloud-edge architecture.

It should be understood that FIG. 1 is intended only to illustrate some concepts of the present disclosure and is not intended to limit the scope of the present disclosure.

The process for expanding a storage device cluster according to embodiments of the present disclosure is described in detail below in conjunction with FIG. 2. For the convenience of understanding, specific data mentioned in the following description is illustrative and is not intended to limit the protection scope of the present disclosure. It should be understood that embodiments described below may also include additional actions not shown and/or may omit actions shown, and the scope of the present disclosure is not limited in this regard.

Figure 2:
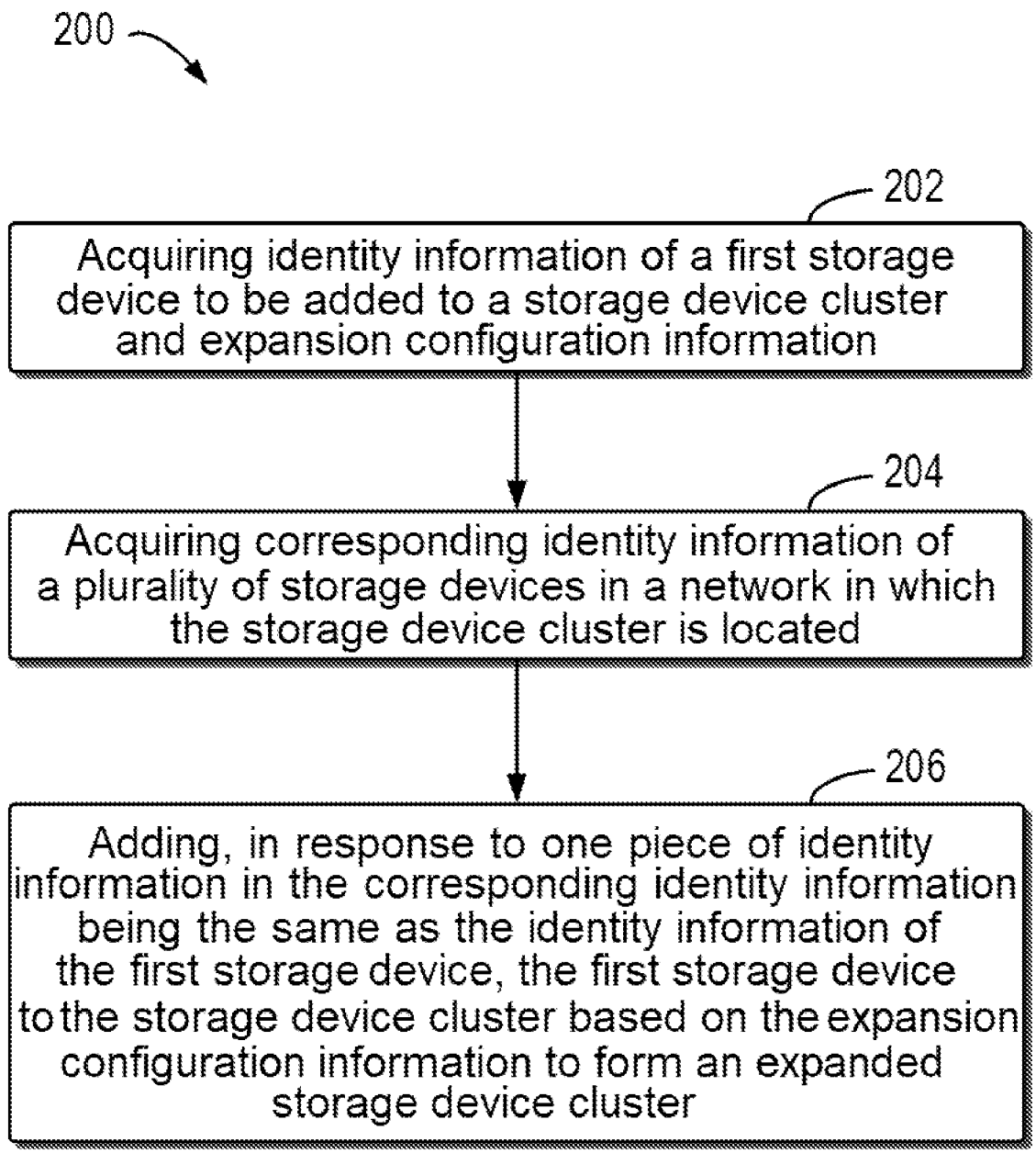
FIG. 2 illustrates a flow chart of a process for expanding a storage device cluster according to embodiments of the present disclosure.

FIG. 2 illustrates a schematic diagram of a process 200 for expanding a storage device cluster according to embodiments of the present disclosure. In some embodiments, the process 200 may be implemented in the computing device 110 of FIG. 1. The process 200 for expanding a storage device cluster according to embodiments of the present disclosure is described with reference to FIG. 2. For case of understanding, specific examples mentioned in the following description are all illustrative and are not intended to limit the protection scope of the present disclosure.

As shown in FIG. 2, at 202, the computing device 110 may acquire identity information of the first storage device 120 to be added to the storage device cluster 130 and the expansion configuration information. In some embodiments, the identity information of the first storage device 120 and the expansion configuration information is pre-inputted by the user. As an example, the user may determine the identity information of the first storage device 120 and the expansion configuration information during the procurement process, where the identity information may be a device identification number, and the expansion configuration information may be a storage protection level, a RAID level, an address of an access network, a security protocol certificate, and so on.

When the computing device 110 receives via a relevant API the identity information of the first storage device 120 and the expansion configuration information inputted by the user, the computing device 110 may store both the information to a database and initiate a session for expanding the storage device cluster 130. In some embodiments, this session is also stored to the database for use in displaying the state of the expansion of the storage device cluster. It should be understood that the database may be set inside the computing device 110 or communicatively connected to the computing device 110 from the outside.

At 204, the computing device 110 may acquire corresponding identity information of a plurality of storage devices in a network in which the storage device cluster 130 is located. In some embodiments, in order to acquire the identity information of these storage devices, the computing device 110 may first acquire the state of the above session from the database. If this state is an unstarted state, it indicates that the task for the connection of the first storage device 120 has not yet started, whereby the computing device 110 may acquire the corresponding identity information of these storage devices. In other words, if the state is an in-progress state or an expanded state, it indicates that the computing device 110 has already acquired the corresponding identity information of these storage devices and thus does not need to initiate further acquisition operations.

In some embodiments, the process of acquiring the identity information of these storage devices may include: the computing device 110 sending a query message to a multicast router in the network to cause the multicast router to send the query message to the plurality of storage devices; and the computing device 110 receiving corresponding feedback messages from the plurality of storage devices, the corresponding feedback messages including the corresponding identity information of these storage devices, respectively.

It should be understood that Zeroconf and mDNS-SD technologies may be utilized to implement the above processes. In the Zeroconf technology, after a device is connected to a management network, it is not necessary to assign an IP address to it, but instead the device can broadcast in the management network itself to send a query message to other devices. Based on the responses from these other devices, the device can judge whether it can use a link-local address. This address is a unique address which can be used in the management network that is available only in a local area network and reachable by a switch. Thus, a new device can assign itself an address through the zeroconf technology, wherein the address does not conflict with other devices. Of course, it is not yet possible to manage the device by using this address.

Further, the management of the new device can be achieved using the mDNS-SD (multicast DNS, which is a decentralized DNS) technology. As an example, a router with the multicast capability is required in the management network. The device that has assigned itself an address using the Zeroconf technology can register its own information (e.g., device information) through the multicast router in order to record a service name, a Zeroconf address, a port, and so forth. It should be understood that multicast for mDNS requires a router to manage the multicast domain, so the address is fixed in mDNS. Each device, after assigning an address itself by Zeroconf, can establish a multicast relationship with the router: the service provided, the Zeroconf address, and other associated information, all of the information being registered to a multicast group. When the storage device cluster is to be expanded, the computing device 110 can send an mDNS query message to the multicast router. Since the multicast router knows all the registered devices in the multicast cluster, the multicast router can mass send the query message to the other devices. These devices may return their own information (e.g., the service name, the Zeroconf address, etc.) as feedback messages to the multicast router, which in turn forwards these feedback messages to the computing device 110.

At 206, the computing device 110 may determine whether one piece of identity information in the corresponding identity information of these storage devices is the same as the identity information of the first storage device 120, and if so, the first storage device 120 may be added to the storage device cluster 130 based on the expansion configuration information to form an expanded storage device cluster.

In some embodiments, if the corresponding identity information of these storage devices is all different from the identity information of the first storage device 120, the computing device 110 may set the session to an unstarted state. Alternatively, if one piece of identity information in the corresponding identity information of these storage devices is the same as the identity information of the first storage device 120, the computing device 110 may set the session to an in-progress state.

In addition, in some embodiments, in order to add the first storage device 120 to the storage device cluster 130 based on the expansion configuration information, the computing device 110 may determine the first storage device 120 and these storage devices as an expanded storage device cluster based on the expansion configuration information and set the session to an expanded state. By periodically viewing these states, the computing device 110 can determine whether it needs to initiate a query for the storage devices in the storage device cluster 130.

The process of expanding a storage device cluster according to embodiments of the present disclosure will be described in detail below with reference to FIG. 3A, FIG. 3B, and FIG. 3C.

Figure 3A:
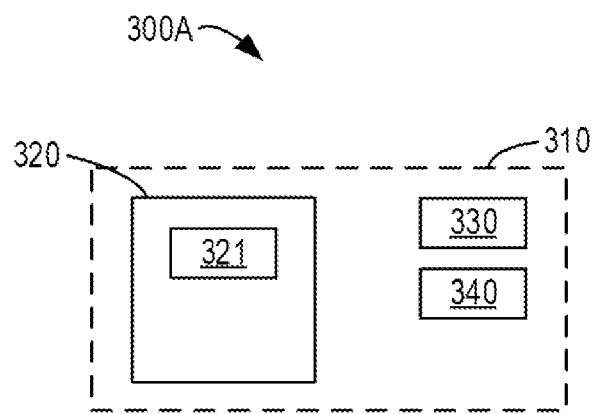
FIG. 3A illustrates a schematic diagram of a first scenario of a management network to which a first storage device is not connected according to embodiments of the present disclosure.

FIG. 3A illustrates a schematic diagram of a first scenario 300A of a management network to which a first storage device is not connected according to embodiments of the present disclosure. As shown in FIG. 3A, there are a plurality of connected storage devices in a management network 310, for example, a storage device 321, a storage device 330, and a storage device 340. In addition, the storage device 321 in FIG. 3A belongs to a storage device cluster 320. It should be understood that this schematic diagram is for example purposes only, and that in practice more storage devices may exist in the storage device cluster 320.

As described above, when a user is ready to add a new storage device to the storage device cluster 320, the user may pre-input identity information of that storage device and expansion configuration information. In the scenario of FIG. 3A, the identity information of the storage devices in the management network 310 can be periodically viewed. At this point, the identity information of the storage devices 330 and 340 in the management network 310 is all different from the identity information inputted by the user.

Figure 3B:
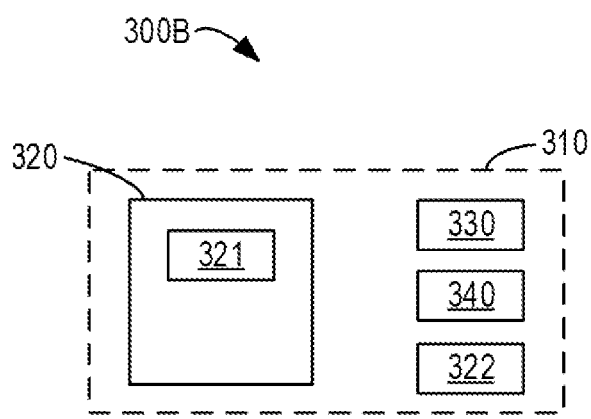
FIG. 3B illustrates a schematic diagram of a second scenario of the management network to which the first storage device is freshly connected according to embodiments of the present disclosure.

Further, FIG. 3B illustrates a schematic diagram of a second scenario 300B of the management network to which the first storage device is freshly connected according to embodiments of the present disclosure. As shown in FIG. 3B, after a new storage device 322 is connected to the management network 310, it can be determined that the identity information fed back by the new storage device 322 is the same as the identity information pre-inputted by the user because the identity information of the storage devices in the management network 310 is periodically viewed. As a result, it can be determined that the new storage device 322 that the user wants to add is already connected to the management network 310.

Figure 3C:
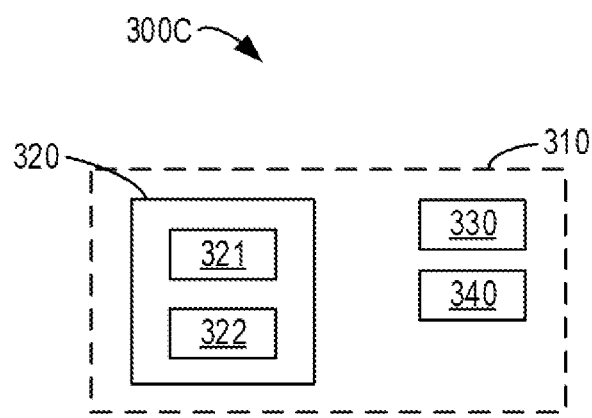
FIG. 3C illustrates a schematic diagram of a third scenario of adding the first storage device to a management network of a storage device cluster according to embodiments of the present disclosure.

FIG. 3C further illustrates a schematic diagram of a third scenario 300C of adding the first storage device to a management network of a storage device cluster according to embodiments of the present disclosure. As illustrated in FIG. 3C, the storage device 322 can be added to the storage device cluster 320 based on the expansion configuration information pre-inputted by the user so as to enable expansion of the storage device cluster.

Specifically, storage devices operating in the storage device cluster typically run the zeroconf/mDNS-SD service, thereby allowing these storage devices to discover each other in the same L2 network. These storage devices can automatically assign an available link-local address to the management port connected to the management network. It should be understood that each storage device can discover the assigned link-local addresses and identifiers of other devices in the same management network, thus allowing these storage devices to send configuration instructions to each other. Thus, by utilizing the zeroconf/mDNS-SD service, each storage device cluster can provide one new REST (representational state transfer) API for the corresponding identity information registration. Once the user has determined a storage device for the user to expand the storage device cluster, the user can invoke the API to input the identity information of that storage device and the expansion configuration information. Once any storage device for which the identity information and the expansion configuration information have been inputted is discovered by the storage device cluster in the management network after it has been properly connected to the management network and started up, the storage device cluster will use the provided configuration information to automatically start the expansion process.

Figure 4:
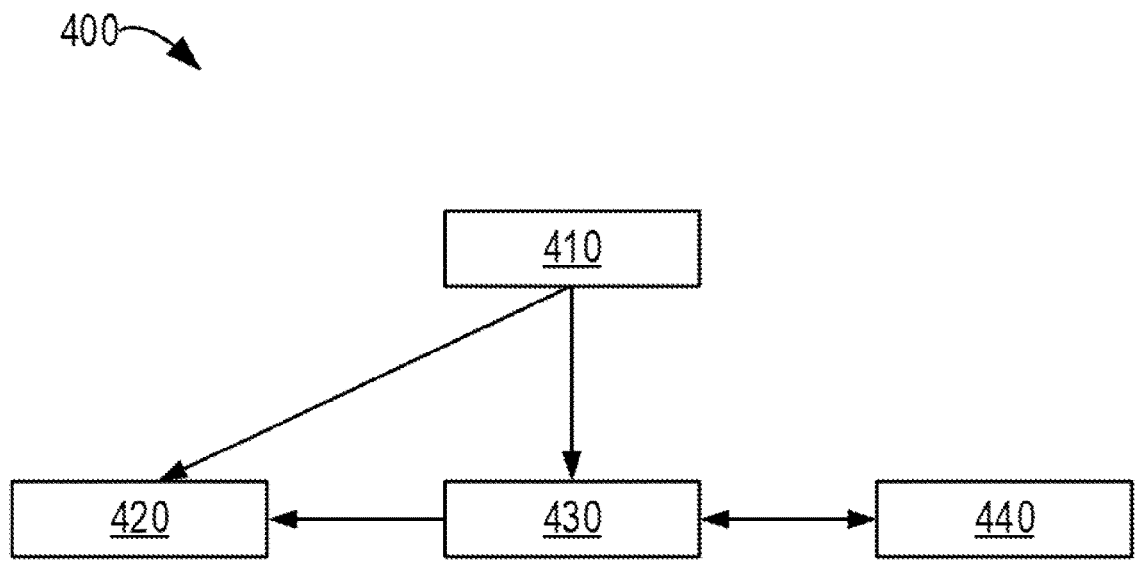
FIG. 4 illustrates a schematic diagram of a computing device for expanding a storage device cluster according to embodiments of the present disclosure.

FIG. 4 illustrates a schematic diagram of a computing device 400 for expanding a storage device cluster according to embodiments of the present disclosure. As shown in FIG. 4, the computing device 400 may contain a plurality of modules, such as an API service module 410, a storage module 420, an expansion service module 430, and a query module 440. In some embodiments, the API service module 410 may be configured to provide a REST API endpoint to receive the identity information and the expansion configuration information inputted by a user. Further, the API service module 410 may store such information to the storage module 420. It should be understood that there may be a previously described database maintained in the storage module 420. Thereafter or concurrently, the API service module 410 may initiate a request to the expansion service module 430 to cause the expansion service module 430 to initiate an expansion session.

As an example, upon receiving the request from the API service module 410, the expansion service module 430 first creates an expansion session in an unstarted state and saves the session to a database maintained in the storage module 420. At this point, the database may contain at least the identity information associated with the storage device to be added, the expansion configuration information, and the corresponding expansion session. Thereafter, the expansion service module 430 is configured to send mDNS-SD queries to a multicast router using the query module 440 at a predetermined interval. The multicast router sends the mDNS-SD query data packets to each storage device running zeroconf/mDNS-SD in the same L2 network. If the expansion service module 430 finds the expected identity information from the mDNS-SD response from each storage device, it can change the expansion session to the in-progress state and perform management operations on the newly added storage devices using the expansion configuration information pre-inputted by the user. When the configuration is complete, the expansion service module 430 can change the state of the expansion session to the expanded state.

With embodiments of the present disclosure, data center management and operation costs can be reduced by means of the automated storage device cluster expansion process. In addition, the storage device cluster will be expanded once the expected storage devices are found, so users can focus on bulk installation of new devices, thereby significantly reducing the overall deployment time of the expanded devices and improving user experience.

Figure 5:
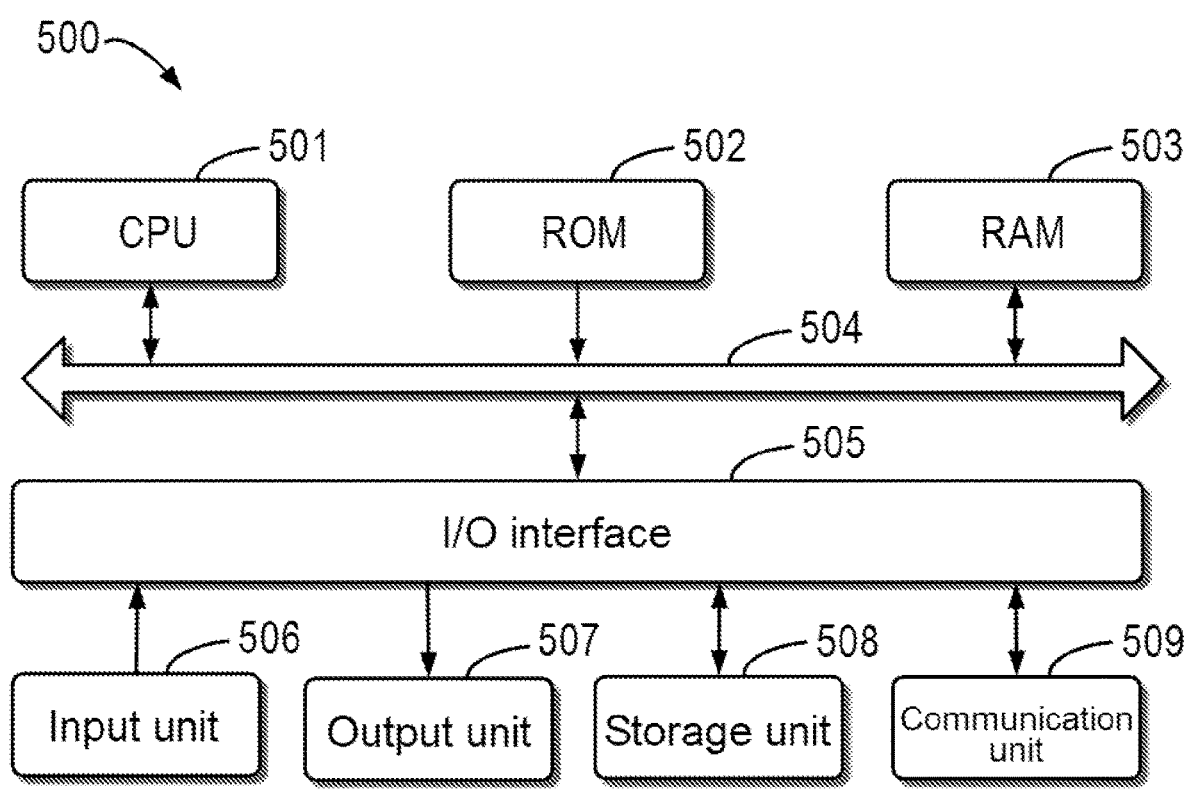
FIG. 5 illustrates a block diagram of an example device that may be used to implement embodiments of the present disclosure.

FIG. 5 illustrates a block diagram of an example device 500 that may be configured to implement embodiments of the present disclosure. For example, the electronic device 500 can be used to implement the computing device 110 shown in FIG. 1. As shown in the figure, the electronic device 500 includes a central processing unit (CPU) 501 that can execute various appropriate actions and processing according to computer program instructions stored in a read-only memory (ROM) 502 or computer program instructions loaded from a storage unit 508 into a random access memory (RAM) 503. Various programs and data required for the operation of the device 500 may further be stored in the RAM 503. The CPU 501, the ROM 502, and the RAM 503 are connected to each other through a bus 504. An input/Output (I/O) interface 505 is also connected to the bus 504.

A plurality of components in the device 500 are connected to the I/O interface 505, including: an input unit 506, such as a keyboard and a mouse; an output unit 507, such as various types of displays and speakers; a storage unit 508, such as a magnetic disk and an optical disc; and a communication unit 509, such as a network card, a modem, and a wireless communication transceiver. The communication unit 509 allows the device 500 to exchange information/data with other devices via a computer network, such as the Internet, and/or various telecommunication networks.

The processing unit 501 executes the various methods and processing described above, such as the process 200. For example, in some embodiments, the various methods and processing described above may be implemented as a computer software program or a computer program product, which is tangibly included in a machine-readable medium, such as the storage unit 508. In some embodiments, part of or all the computer program may be loaded and/or installed to the device 500 via the ROM 502 and/or the communication unit 509. When the computer program is loaded into the RAM 503 and executed by the CPU 501, one or a plurality of steps of any process described above may be implemented. Alternatively, in other embodiments, the CPU 501 may be configured in any other suitable manners (for example, by means of firmware) to execute a process such as the process 200.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, any non-transitory storage device, or any appropriate combination described above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing state information for the computer-readable program instructions. The electronic circuit may execute the computer-readable program instructions so as to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various implementations of the present disclosure have been described above. The foregoing description is illustrative rather than exhaustive, and is not limited to the disclosed implementations. Numerous modifications and alterations are apparent to persons of ordinary skill in the art without departing from the scope and spirit of the illustrated implementations. The selection of terms used herein is intended to best explain the principles and practical applications of the implementations or the improvements to technologies on the market, or to enable other persons of ordinary skill in the art to understand the implementations disclosed herein.

The invention claimed is:

1. A method for expanding a storage device cluster, comprising:
    acquiring identity information of a first storage device to be added to the storage device cluster and expansion configuration information;
    acquiring corresponding identity information of a plurality of storage devices in a network in which the storage device cluster is located; and
    adding, in response to one piece of identity information in the corresponding identity information being the same as the identity information of the first storage device, the first storage device to the storage device cluster based on the expansion configuration information to form an expanded storage device cluster;
    wherein acquiring the corresponding identity information of the plurality of storage devices comprises:
    acquiring a state of a session for expanding the storage device cluster from a database; and
    acquiring the corresponding identity information of the plurality of storage devices in response to the state being an unstarted state.

2. The method according to claim 1, further comprising:
    storing the identity information of the first storage device and the expansion configuration information to the database in response to receiving the identity information of the first storage device and the expansion configuration information; and
    initiating the session for expanding the storage device cluster.

3. The method according to claim 2, wherein the session is stored to the database for use in displaying the state of the expansion of the storage device cluster.

4. The method according to claim 3, further comprising:
    setting the session to the unstarted state in response to all the corresponding identity information being different from the identity information of the first storage device.

5. The method according to claim 1, wherein acquiring the corresponding identity information of the plurality of storage devices further comprises:
    sending a query message to a multicast router in the network to cause the multicast router to send the query message to the plurality of storage devices; and
    receiving corresponding feedback messages from the plurality of storage devices, the corresponding feedback messages comprising the corresponding identity information of the plurality of storage devices, respectively.

6. The method according to claim 3, wherein adding the first storage device to the storage device cluster based on the expansion configuration information comprises:
    determining the first storage device and the plurality of storage devices as the expanded storage device cluster based on the expansion configuration information; and
    setting the session to an expanded state.

7. The method according to claim 1, wherein the expansion configuration information comprises at least one of:
    a storage protection level;
    a RAID level;
    an address of the network; and
    a security protocol certificate.

8. An electronic device, comprising:
    a processor; and
    a memory coupled to the processor, the memory having instructions stored therein, wherein the instructions, when executed by the processor, cause the electronic device to perform actions comprising:
    acquiring identity information of a first storage device to be added to a storage device cluster and expansion configuration information;
    acquiring corresponding identity information of a plurality of storage devices in a network in which the storage device cluster is located; and
    adding, in response to one piece of identity information in the corresponding identity information being the same as the identity information of the first storage device, the first storage device to the storage device cluster based on the expansion configuration information to form an expanded storage device cluster;
    wherein acquiring the corresponding identity information of the plurality of storage devices comprises:
    acquiring a state of a session for expanding the storage device cluster from a database; and
    acquiring the corresponding identity information of the plurality of storage devices in response to the state being an unstarted state.

9. The device according to claim 8, wherein the actions further comprise:
    storing the identity information of the first storage device and the expansion configuration information to the database in response to receiving the identity information of the first storage device and the expansion configuration information; and
    initiating the session for expanding the storage device cluster.

10. The device according to claim 9, wherein the session is stored to the database for use in displaying the state of the expansion of the storage device cluster.

11. The device according to claim 10, wherein the actions further comprise:
    setting the session to the unstarted state in response to all the corresponding identity information being different from the identity information of the first storage device.

12. The device according to claim 8, wherein acquiring the corresponding identity information of the plurality of storage devices further comprises:
    sending a query message to a multicast router in the network to cause the multicast router to send the query message to the plurality of storage devices; and
    receiving corresponding feedback messages from the plurality of storage devices, the corresponding feedback messages comprising the corresponding identity information of the plurality of storage devices, respectively.

13. The device according to claim 10, wherein adding the first storage device to the storage device cluster based on the expansion configuration information comprises:
    determining the first storage device and the plurality of storage devices as the expanded storage device cluster based on the expansion configuration information; and
    setting the session to an expanded state.

14. The device according to claim 8, wherein the expansion configuration information comprises at least one of:
    a storage protection level;
    a RAID level;
    an address of the network; and
    a security protocol certificate.

15. A computer program product tangibly stored on a non-transitory computer-readable medium and comprising machine-executable instructions, wherein the machine-executable instructions, when executed, cause a machine to perform actions comprising:
    acquiring identity information of a first storage device to be added to a storage device cluster and expansion configuration information;
    acquiring corresponding identity information of a plurality of storage devices in a network in which the storage device cluster is located; and
    adding, in response to one piece of identity information in the corresponding identity information being the same as the identity information of the first storage device, the first storage device to the storage device cluster based on the expansion configuration information to form an expanded storage device cluster;
    wherein acquiring the corresponding identity information of the plurality of storage devices comprises:
    acquiring a state of a session for expanding the storage device cluster from a database; and
    acquiring the corresponding identity information of the plurality of storage devices in response to the state being an unstarted state.

16. The computer program product according to claim 15, wherein the actions further comprise:
    storing the identity information of the first storage device and the expansion configuration information to the database in response to receiving the identity information of the first storage device and the expansion configuration information; and
    initiating the session for expanding the storage device cluster.

17. The computer program product according to claim 16, wherein the session is stored to the database for use in displaying the state of the expansion of the storage device cluster.

18. The computer program product according to claim 17, wherein the actions further comprise:
    setting the session to the unstarted state in response to all the corresponding identity information being different from the identity information of the first storage device.

19. The method according to claim 1, wherein acquiring the identity information of the first storage device comprises:
    receiving a self-assigned network address from the first storage device.

20. The method according to claim 19, wherein receiving the self-assigned network address from the first storage device comprises:
    receiving, as the self-assigned network address, an Internet Protocol (IP) address which is unique within the network for use as a link-local address that enables the first storage device to be reachable by a switch.

* * * * *